March 11, 1930.  A. C. STEEVES  1,750,202
LAND BREAKER AND PLOW
Filed May 18, 1928  2 Sheets-Sheet 2
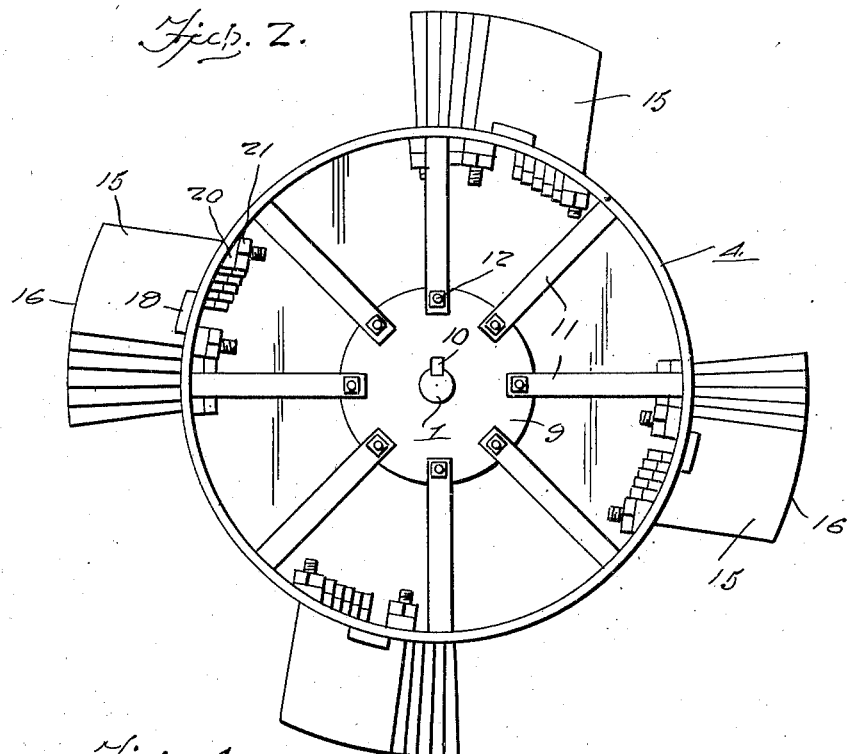
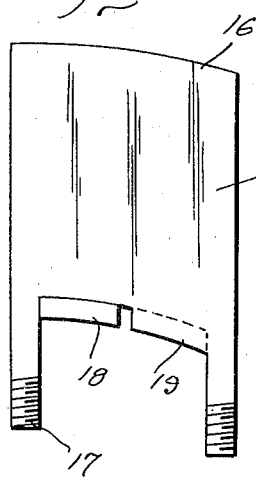
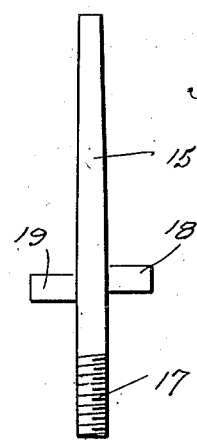
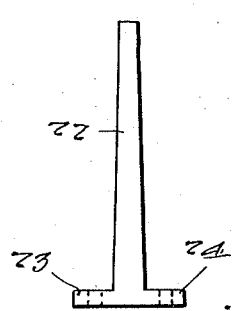
Inventor
A. C. Steeves
By Clarence A O'Brien
Attorney Patented Mar. 11, 1930

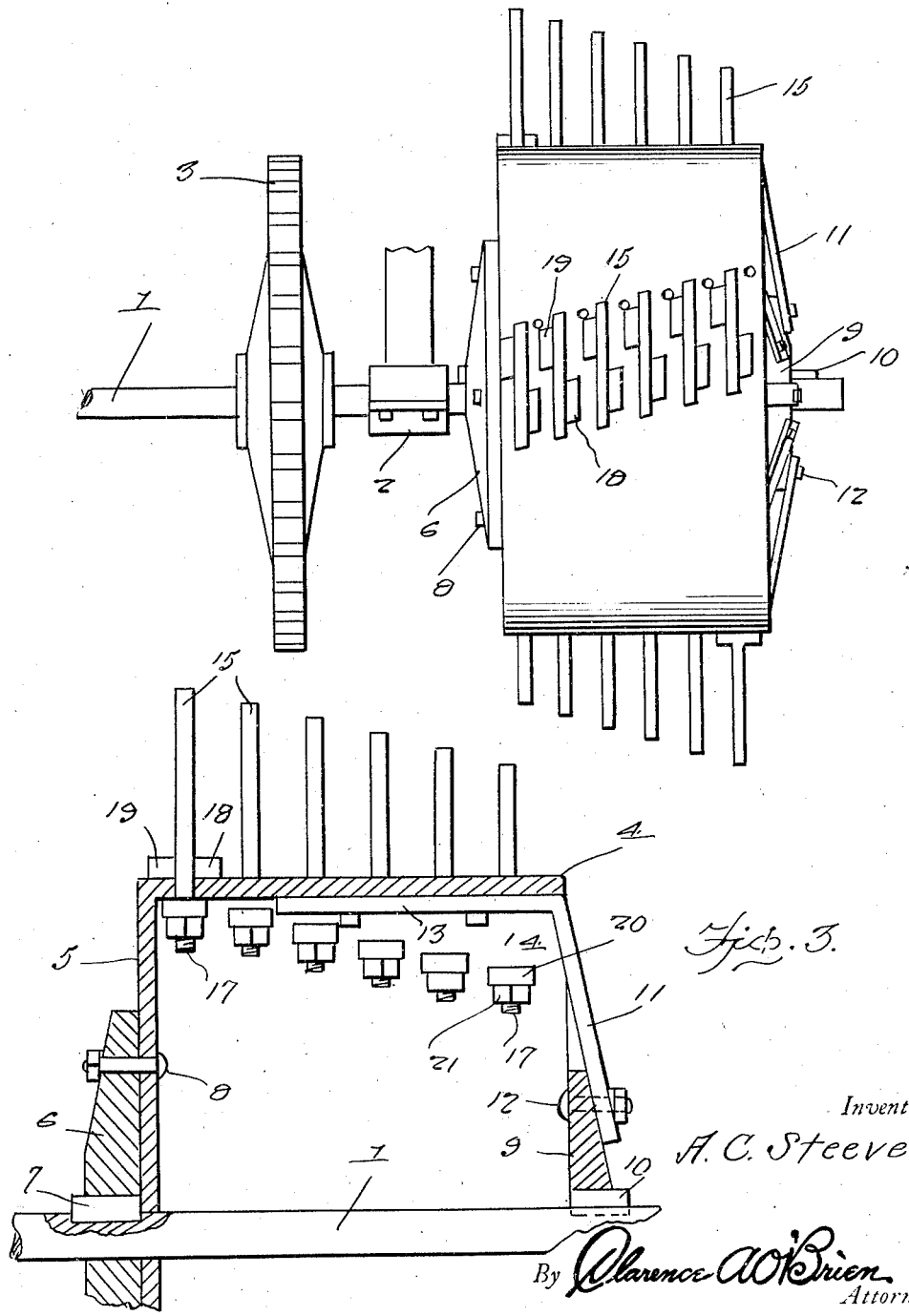

1,750,202

UNITED STATES PATENT OFFICE

AUBREY C. STEEVES, OF HILLSBORO, NEW BRUNSWICK, CANADA

LAND BREAKER AND PLOW

Application filed May 18, 1928. Serial No. 278,761.

The present invention relates to improvements in agricultural implements and has reference more particularly to a land breaker and plow.

One of the important objects of the present invention is to provide a device of the above mentioned character that is particularly adapted to be used in breaking up or plowing land, which has never been plowed before, the device also being adapted for use upon stubble land, as well as for tearing up roads under construction.

One of the important objects of the present invention is to provide a land breaker and plow that will at all times be efficient and reliable in its operation, the same being further simple in construction, inexpensive, strong and durable, and further well adapted to the purpose for which it is designed.

Other objects of the invention will become apparent as the nature of the invention proceeds and when taken in connection with the accompanying drawings.

In the accompanying drawings, forming a part of this application and in which like numerals designate like parts throughout the several views:

Figure 1 is a top plan view of the land breaker and plow embodying my invention.

Figure 2 is a side elevation thereof.

Figure 3 is a fragmentary vertical sectional view through the drum showing the earth engaging blades secured thereon and the supporting means for the drum.

Figure 4 is a detail of one of the blades.

Figure 5 is a side elevation of the blade, and

Figure 6 is a view similar to Figure 5, of a modification of the blade.

In the drawings, wherein for the purpose of illustration is shown the preferred embodiment of my invention, the numeral 1 designates a drive shaft that is adapted to be mounted in a suitable frame (not shown) and which frame may be supported on a trailer or tractor. This drive shaft is journaled through a suitable bearing 2, and a sprocket wheel 3 is secured on the drive shaft whereby the same can be operatively connected up with the driving mechanism of the tractor by a suitable sprocket chain. A drum 4 which is open at its outer side is disposed on the outer end portion of the drive shaft and the closed side or end 5 of the drum is formed with a central opening through which the drive shaft extends. A circular plate member 6 is secured on the drive shaft 1, for rotation therewith by means of the key 7 and the plate is disposed against the outer face of the closed end 5 of the drum 4 and is furthermore secured thereto by the bolt 8, in the manner as clearly shown in Figure 3 of the drawings.

A smaller circular plate 9 is secured on the outer end portion of the drive shaft 1 by the key 10 for rotation with this shaft and the inner face of this plate 9 lies in substantially the same plane with the outer open side of the drum 4. A series of radially disposed strap irons 11 are secured at their inner ends on the outer face of the plate 9, by means of the bolts 12 and the outer end portions of these strap irons are disposed laterally and inwardly for disposition against the inner peripheral face of the drum 4, as shown at 13, in Figure 3, and suitable bolts 14 secure the outer end portions of the strap irons to the drum, whereby to provide a rigid support for the drum.

Also forming a salient part of the present invention are a plurality of series of radiating earth engaging blades 15. Each blade comprises a substantially rectangular shaped element which is slightly curved at its outer and inner edges as indicated at 16, in Figure 4. A pair of threaded bolts 17 extend from the inner edge of each blade at the respective sides thereof and furthermore laterally extending wings 18 and 19 are formed on the lower edge of each blade between the bolts 17, these wings being disposed in opposite directions and the purpose thereof will be presently described. As is clearly shown in Figure 4, the laterally disposed wings are curved in order to conform to the contour of the outer peripheral face of the drum 4, when the blades are positioned on the drum.

The blades of each series are disposed in parallel spaced relation with respect to each other and furthermore, the blades in each series are arranged in helical relation and this is clearly illustrated in Figures 1 and 2 of the drawings.

The drum 4 is formed with spaced openings also arranged in a helical manner to accommodate the threaded bolts 17 and formed on the inner peripheral face of the drum beneath each opening is the lug 20, the inner face of which is flat so that the nut 21 which is threaded on the inner threaded end of each bolt will engage with the flat inner face of the respective lugs to positively secure the blades in a rigid position, and in radial relation with respect to the outer peripheral face of the drum. The blades are further disposed circumferentially with respect to the drum. The laterally disposed curved wings will engage with the outer peripheral face of the drum to act as a brace for each blade.

In Figure 6, I have shown a modification of the blade structure, wherein the blade 22 is formed at its base or inner edge portion with the opposed apertured lugs 23, and 24, that fit flush against the outer peripheral face of the drum and bolts of conventional construction are disposed through the apertured lugs and through suitable openings formed in the rim of the drum to secure the blades in a stationary manner.

The use of my improved land breaker or plow is thought to be readily obvious from the construction disclosed, and therefore a further detailed description of the same is thought unnecessary.

By arranging the blades in the manner as shown and described, the device will be positive and efficient in lifting out stones and rocks, as well as bushes and small trees to clear up farm land that has never been broken and also the soil will be pulverized by the action of the blades travelling thereover.

While I have shown the preferred embodiment of my invention, it is to be understood that various changes in the size, shape and arrangement of parts may be resorted to, without departing from the spirit of the invention or the scope of the appended claim.

I claim:

In a structure of the class described, a rotatable drum, a plurality of rectangular shaped earth engaging blades extending radially from the drum, a pair of threaded bolts formed on the inner edge of each blade adjacent the respective sides thereof, for disposition through openings formed in the drum, a lug arranged on the inner face of the periphery of the drum beneath the opening and being formed with an opening through which the threaded end of the respective bolt projects, the inner face of each lug being flat, and a nut threaded on the inner end of each bolt engaging with the flat face of the respective lug, the inner edge of the blade being curved, and laterally extending flanges formed on the opposite sides of the inner edge portion of each blade between said bolts, the inner faces of the flanges being curved to conform to the contour of the outer peripheral face of the drum.

In testimony whereof I affix my signature.

AUBREY C. STEEVES.